March 30, 1926.  
H. C. NIXON  
1,578,349
VALVE FOR WATER, STEAM, AIR, GASES, OILS, AND OTHER FLUIDS
Filed March 3, 1919
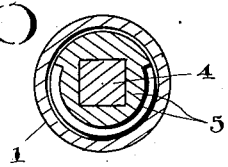
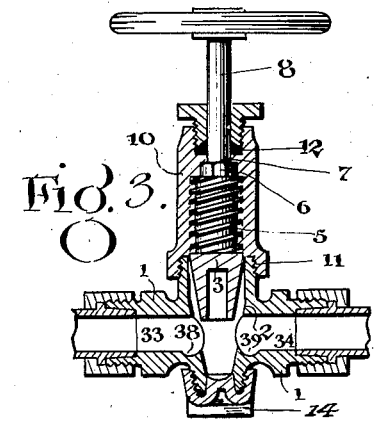
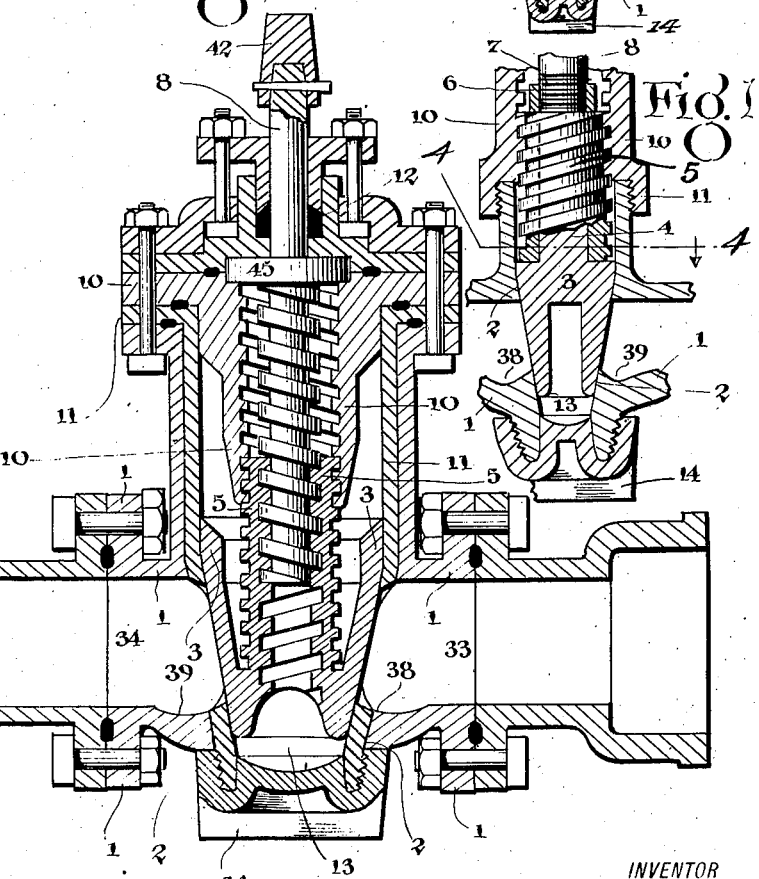
WITNESSES
INVENTOR  
Horace C. Nixon.  
BY  
ATTORNEYS Patented Mar. 30, 1926.

1,578,349

UNITED STATES PATENT OFFICE.

HORACE C. NIXON, OF SASKATOON, SASKATCHEWAN, CANADA.

VALVE FOR WATER, STEAM, AIR, GASES, OILS, AND OTHER FLUIDS.

Application filed March 3, 1919. Serial No. 280,508.

*To all whom it may concern:*

Be it known that I, HORACE C. NIXON, a citizen of Canada, residing at Saskatoon, in the Province of Saskatchewan, in the Dominion of Canada, have invented certain new and useful Improvements in Valves for Water, Steam, Air, Gases, Oils, and Other Fluids, of which the following is a specification.

One of the principal objects of my invention is to construct a valve which is independent of discs of leather, rubber, soft metal, or any composite material for its cutting-off property, which end is effected by the intimate and thorough slidable interposition or contact of the ground-in surfaces of the truncated conico-cylindrical casing of the cock and the valve key, this condition being brought about in a spiral direction, wherein resides the chief object of my invention, which is designed particularly to secure efficiency in operation, simplicity, and standardization in construction and working conditions, thereby ensuring economy in both manufacture and maintenance.

Another object of the invention is to eliminate from valves all inaccessible recessed eddy-forming parts, such as those surrounding flat, conical or raised valve seats, which tend toward the deposition and retention therein of foreign matter, such as particles of scale, gravel, grit and metals, which substances cut either or both the seating and the discs causing valves so constructed to quickly let-by or leak.

Another object is to construct a valve, or cock, which will have a clear throughway when open, thus eliminating friction and the breaking up of the effluent, and will when closed commence to open with an ascending or descending rotary motion that will lower the resistance from the lateral stress of the source of supply to the minimum, thereby greatly reducing the power required to operate the valve, and, at the same time, make the valve, more or less, permanently self-grinding.

A further object is to provide in a valve, or cock, a detritus chamber, or sand pocket, which shall be so placed and constructed that it will, in closing, retain harmlessly within itself any particles of grit, metals or sand, that can possibly enter the valve, the bottom portion of which contrivance may be easily taken off for the purpose of removing these substances any time the valve is shut down; the pocket may then be cleansed or blown-out by a partial opening of the valve before re-assembling; this provision also facilitates the removal of the material used for the grinding-in and the regrinding of the valve.

Other objects will disclose themselves as the description proceeds, the means and devices used in this invention naturally differing slightly in detail in fittings for the various purposes which cut-offs using this valve will serve, for instance:—in a fire hydrant, or in a main valve for use under a roadway with only a surface box to afford access, it is not desirable to have a longitudinally movable operating spindle; therefore the operating means for such fittings is designed to obviate that non-desideratum, though where it is possible to build a valve chamber, or in situations where there is sufficient headroom, an upwardly extending spindle may serve a useful purpose by indicating whether the valve is open or closed. The means by which I achieve this object, shown in the drawings is, I believe, unique in the operating of valves, but in some circumstances it may be desirable to modify the construction.

The invention resides in the peculiar construction, combination, working arrangement and standardization of the various parts, which I now more particularly describe, and claim, and which are illustrated in the accompanying drawings forming a part of this specification, in which similar characters of reference indicate corresponding parts throughout the various figures, of which:—

Figure 1 represents a view mainly in sectional elevation of the ground-in valve barrel, the valve key, the inlet and the outlet ducts, the inlet and outlet ports, the stem, the operating cylinder, and means of securing the same in place, and the working barrel.

Figure 2 shows mainly in section the valve operating means, etc., modified for sluice or under-street work, the working barrel being preferably lined with brass or gun metal for most conditions.

Figure 3 is a longitudinal section showing the valve used in an ordinary main or branch cut-off or stop cock, Figure 4 is a transverse section on line 4—4 of Figure 1 showing square portion of stem 4.

The body of the fitting 1 constitutes the attachment to the pipes or conduits, carries the ground-in barrel of the valve 2, the inlet port 38, the outlet port 39, and provides the attachment for the operating means and sand pockets. The truncated conico-cylindrical barrel 2 may be integral with the body 1 as shown in Figures 1 and 3, or may be inserted in the body, as shown in Figure 2.

The ground-in reciprocating plug or key 3 is shaped to insure thorough and intimate contact with the conical portion of the barrel 2 and to work slidably through the cylindrical portion thereof. It is preferably partially hollow.

The lower portion 4 of the stem, as shown in Figures 1 and 3, which is in continuity with and extends centrally from the top of the key 3 is preferably squared and passes slidably through the operating cylinder 5, which is interiorly shaped in conformity therewith, and exteriorly carries the operating worm or thread.

This cylinder 5 is held, by the lock nut 6, which is screwed down on the threaded portion 7 of the stem tightly against the top of the cylinder 5. The parts 3, 4, 7 and 8, 5, 6 and 10 are all to a standard and are interchangeable in all fittings, using the same size and similar combination, irrespective of the purpose for which the cocks are used, and are so contrived for the convenience of the mutual regrinding of the key 3 and the barrel 2.

The working barrel 10 is threaded inside to conform to the operating cylinder 5 and takes up the work of opening and closing the valve by the transposition of the cylinder 5 resulting from turning power transmitted through the stem 8. This working barrel 10 is screwed or bolted on to the body 1 at 11, and retained by a set screw or bolts; it has a gland or packing at the upper end, around the stem.

The sand pocket or detritus chamber 13 is preferably formed on all straight through-way cocks, and is for the purpose of taking care of any particles of foreign matter that are carried along by the velocity of the fluid the cocks are to control: the bottom portion may be taken off at any time after closing the valve, and the pocket effectually blown-out before re-assembling; the material used for grinding and regrinding the valve is removed by this means.

38 is the inlet port which is always shaped as shown for clearance purposes, and 39 is the outlet port in all views, though these ports are similar and reversible, as are consequently, the ducts 33 and 34, the fittings containing the valve, etc. being capable of control from either and equally. 42 designates the attachment for the turning rods secured to the tops of the stem 8 for underground work (see Figure 2) and the flange 45 prevents perpendicular motion of stem.

In operating the key 3, shown in Figure 2, the stem 8 is manipulated thereby turning the threads on the stem which engage the internal threads of the hollow member 5 whereby the key 3 is moved vertically downward into its engagement wtih its ground-in seat. When the truncated member 3 engages its complementary shaped seat further downward movement of the truncated member 3 will be resisted. A continued rotation of the stem 8 will cause the threads on the stem to sufficiently bind with the internal threads on the hollow member 5 to cause slight rotation of the member 5 and likewise the key 3 resulting in grinding of the key within its conical seat in the body 2, Figures 1 and 3, and in the shell 11, Figure 2.

The differential pitch between the threads on the stem 8 and the threads on the working barrel causes the threads on the stem 8 to bind with the internal threads of the hollow barrel 5 whereby the threaded working barrel 5 will be caused to be rotated and operate the key 3. It will be noted that the shoulder 45 on the stem 8 maintains the stem from reciprocation when rotated and therefore the barrel 5 will be rotated and moved upwardly by its engagement with the internal threads of the body 10.

What I claim is:

1. In a valve or cock, the combination of a body portion with means for attaching to pipes and conduits, an inlet duct, an outlet duct, a ground-in conico-cylindrical barrel containing inlet and outlet ports, and a sand pocket, means for opening and closing the sand pocket, a reciprocating key adapted to be ground-in with the conical portion of the barrel in the opening and closing of the valve, an operating stem for the key, a working barrel threaded interiorly, means for securing the same rigidly to the body portion, an operating cylinder attached to the operating stem and threaded exteriorly in conformity with the working barrel and formed interiorly in conformity with the operating stem, and a gland to prevent escape of fluid around the stem.

2. The combination in a valve or cock of a body portion having inlet and outlet ducts, a chamber or barrel having a ground-in truncated conical lower portion provided with inlet and outlet ports and a sand pocket, means for opening the sand pocket for emptying; a cylindrical portion of barrel, an attachment for operating means, an operating means comprising a cylinder for alternately ensuring intimate and thorough contact of the truncated conical key with the barrel and free egress of the fluid controlled by the cock, an operating stem with means of attachment to operating cylinder and key, a truncated conical key adapted to be ground-in with the conical portion of the barrel upon opening and closing of the key and having a hollow lower end.

3. In combination, a valve or cock body having inlet and outlet ducts, a chamber or barrel provided with a ground-in truncated conical portion, inlet and outlet ports and a cylindrical portion, a reciprocating key adapted to be ground-in with conical portion of barrel and adapted to spirally and slidably move through the cylindrical portion in the opening and closing of the valve, an operating means to effect such movement, said body having a sand pocket, and means for emptying the said pocket.

4. In valves and other fittings, in combination therewith of a sand pocket adapted to be emptied, said pocket comprising a central circular dished table portion, and a concentric internally threaded upwardly extending wall surrounding said portion and forming a groove therearound.

5. In combination, a valve casing, a frusto-conical valve chamber therein, a frusto-conical hollow valve in said chamber, an internally threaded barrel mounted on said casing, a threaded hollow stem rigidly attached to said valve and in cooperative engagement with said threaded barrel, means associated with said hollow stem for rotating said valve in said barrel, and a removable sand pocket below the valve and in communication with the space in the valve.

6. In combination, a valve casing, comprising a frusto-conical valve chamber therein, a hollow frusto-conical valve, a sand pocket below said valve and in communication with the space in said valve.

7. A valve device comprising a valve casing having a frusto-conical valve chamber, a threaded barrel mounted on said casing, a hollow frusto-conical valve, a threaded stem rigid with said valve and mounted in said barrel, a sand pocket below said valve and communicating with the space in said hollow valve, and means for actuating said valve.

8. In combination, a valve casing, a frusto-conical valve chamber extending through said casing, a lining for said chamber extending through and beyond the valve chamber, a frusto-conical valve in said lined chamber, a sand pocket below said valve, said sand pocket comprising a closure mounted on said lining, and means for actuating said valve.

HORACE C. NIXON.